United States Patent [19]

Sochol et al.

[11] 4,138,354

[45] Feb. 6, 1979

[54] PREPARATION OF MANGANESE/COBALT BROMIDE

[75] Inventors: Irving Sochol, Baltimore; Jay Y. Welsh, Catonsville, both of Md.

[73] Assignee: Chemetals Corporation, Baltimore, Md.

[21] Appl. No.: 859,281

[22] Filed: Dec. 12, 1977

[51] Int. Cl.$^2$ .................... B01J 27/08; B01J 23/84; C01B 9/04
[52] U.S. Cl. .................................. 252/182; 252/441; 423/463
[58] Field of Search ................ 252/182, 441; 423/463

[56] References Cited

U.S. PATENT DOCUMENTS

| | | | |
|---|---|---|---|
| 3,927,188 | 12/1975 | Jones et al. | 423/463 |
| 3,947,557 | 3/1976 | Jones et al. | 423/463 |
| 4,043,944 | 8/1977 | Juguin et al. | 252/441 |

*Primary Examiner*—Benjamin R. Padgett
*Assistant Examiner*—Irwin Gluck
*Attorney, Agent, or Firm*—Cushman, Darby & Cushman

[57] ABSTRACT

A method for the preparation of manganese bromide and cobalt bromide using a manganese/cobalt redox system. Elemental manganese is reacted with a solution of cobalt bromide, forming manganese bromide and elemental cobalt. Subsequent reaction of the cobalt with bromine, and alternate additions of manganese and bromine, can be used to produce a wide range of Mn:Co ratios in the solution.

11 Claims, No Drawings

PREPARATION OF MANGANESE/COBALT BROMIDE

FIELD OF THE INVENTION

This invention relates generally to a method for the preparation of manganous and cobaltous bromides, and more particularly to a redox process for the preparation of mixed manganese/cobalt/bromine catalyst solutions.

BACKGROUND OF THE INVENTION

Manganous bromide ($MnBr_2$) and cobaltous bromide ($CoBr_2$) have wide use as catalysts and catalyst precursors. These compounds and manganese/cobalt/bromine mixtures are particularly useful as catalysts for the oxidative preparation of aromatic carboxylic acids.

While manganous bromide has been prepared by the direct reaction of manganese and bromine, the reaction is inefficient, particularly when conducted in solution. The inefficiency of the solution reaction results from two sequential side reactions, namely the reaction of manganese with water to liberate hydrogen and form $Mn(OH)_2$, followed by the oxidation of $Mn(OH)_2$ by $Br_2$ to form $Mn(OH)_3$. This sequence of reactions often causes as much as 35% of the available manganese to be converted to $Mn(OH)_3$ rather than the desired product.

It would therefore be desirable to provide a process for the preparation of manganous bromide which is direct and efficient. It would be an additional benefit to provide a process which is capable of producing mixed manganese/cobalt/bromine systems from a single reaction mixture in a wide range of proportions.

SUMMARY OF THE INVENTION

It has been discovered that mixed manganous bromide-cobaltous bromide solutions can be prepared by introducing elemental manganese into an aqueous solution of cobalt bromide. The manganese goes into solution as it is oxidized to $Mn^{+2}$. Cobalt in solution is simultaneously reduced to the elemental state, and the addition of a stoichiometric amount of bromine returns this cobalt to solution. Alternate additions of manganese and bromine allow the ratio of Mn:Co in the solution to be adjusted over a wide range of values. Alternatively the cobalt can be completely precipitated to provide a solution rich in $MnBr_2$.

The method of the invention provides numerous advantages. The redox reactions are smooth and efficient, with no significant side reactions to cause loss of reactants or product. Inexpensive raw materials are used, and no special equipment is required. Further, a mixed $MnBr_2$-$CoBr_2$ system of practically any proportion is attainable from a single reaction mixture.

DETAILED DESCRIPTION OF THE INVENTION

The method of the invention is based on the redox reaction of elemental manganese with a solution of cobalt bromide, as set forth in the following equations:

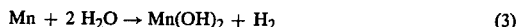

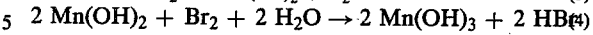

This reaction sequence has been discovered to proceed with considerably better efficiency than the conventional direct reaction of manganese with bromine. The direct reaction is hindered by the following side reactions:

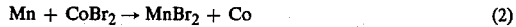

In the method of the invention these side reactions do not occur to any significant extent. When cobalt ions are present in the solution there is a rapid redox reaction with the elemental manganese as in equation (2), and manganese goes into solution with a minimum of hydrogen evolution.

In the usual practice of the method particulate manganese metal, ranging from 5 to 40 mesh and preferably 10 mesh and smaller in size, is added directly to an aqueous solution of cobalt bromide. This solution is most conveniently prepared by mixing pulverulent cobalt metal with water, adding sufficient HBr to bring the pH to below about 2, then adding elemental bromine. The bromine is introduced at a rate which does not result in a discrete liquid bromine phase in the mixture, and generally is added in an approximately stoichiometric proportion to the cobalt present. The cobalt and bromine react smoothly under these conditions, without side reactions, to yield a solution of cobaltous bromide. The concentration of the $CoBr_2$ solution may initially range from 100 grams per liter to 600 grams per liter and preferably is established in the higher portion of this range. The temperature of the solution is preferably maintained below about 50° C. during the reaction.

Manganese metal is then added to the aqueous $CoBr_2$ solution, with agitation, at a rate which allows the redox reaction (2) to proceed quantitatively, without promoting reactions (3) and (4). The manganese addition may be made continuously or in portions. If the addition is made batchwise, it has been found helpful to introduce small amounts of bromine into the solution after each portion of manganese, in order to maintain an effective concentration of cobalt ions in solution. It is theoretically possible to add manganese up to the stoichiometric equivalent of cobalt present without promoting the undesirable side reactions. However, the efficiency of the overall redox system is best if the concentration of cobalt ion in solution is not severely depleted. Dissolved cobalt concentration is preferably maintained in the range of 50-100 grams per liter or higher.

When manganese addition and dissolution is complete, an equivalent amount of elemental cobalt will have been precipitated via reaction (2). A subsequent addition of bromine can now be made to regenerate $CoBr_2$ via reaction (1). Further alternating additions of manganese and bromine can be continued in order to establish any desired Mn:Co ratio in the solution. Typical ratios of Mn:Co range from 1:1 to 4:1, however proper control of the redox reactions can result in Mn:Co ratios of from <1:100 to 100:<1. When the reaction is complete, and the desired concentrations of $MnBr_2$ and $CoBr_2$ have been reached, any remaining elemental cobalt and manganese can be separated by conventional means for reuse in subsequent redox reactions.

Using the method of the invention, it is also possible to initiate the redox reaction using a $CoBr_2$ solution containing a very low concentration of cobalt. Alternate manganese and bromine additions can then be used to build up the manganese concentration to the desired level. In this manner $MnBr_2$ solutions can be prepared using only a small amount of cobalt as the redox initiator. Further economic benefits are realized when the cobalt is recovered and reused.

During the reaction sequence it is preferred to maintain the solution temperature below about 50° C. by cooling, and a range of about 35° C. to about 45° C. has been found to be most efficient. The formation of hydrogen through side reaction (3) is minimized by the lower temperatures, and the bromine vapor pressure is reduced.

After addition of manganese to the solution is complete, it is also possible to prepare a solution of substantially pure $MnBr_2$ by removal of the cobalt component. Elemental cobalt can be separated by filtration, centrifuging, or other standard technique, while dissolved cobalt can be selectively precipitated to leave a solution rich in $MnBr_2$. Cobalt can be precipitated as hydroxide by the addition of basic materials such as $Mn(OH)_2$, or it may be precipitated as CoS by the addition of suitable sulfides such as $H_2S$.

The method of the invention is further illustrated in the following specific examples.

EXAMPLE 1

To 500 ml of water was added 44 grams of pulverulent cobalt metal having an average particle size of about 10 mesh. Two ml of HBr (48%) was then added, followed by 40 ml of bromine. The rate of bromine addition was regulated to prevent the formation of a liquid bromine phase in the mixture. Next 44 grams of particulate manganese metal (particles passing through a 10 mesh Tyler equivalent screen) were added, with agitation, in four equal portions. After each portion of Mn was introduced, an additional 10.5 ml of bromine was added over a 20 minute period. The reaction temperature was maintained below 50° C. throughout.

Upon completion of the last bromine addition, the reaction mixture was gently agitated for an additional 30 minutes, then was filtered through filter paper to remove insolubles. The filtrate had a pH of 2.8 and was found to contain 41.4 grams of Co and 41 grams Mn, equivalent to 94.1% and 93.2% recovery respectively. The insolubles removed from the reaction mixture were found to contain 1.6 grams Co and 2.2 grams Mn.

EXAMPLE 2

A glass column 1.5 inch in diameter and 12 inches in length was charged with cobalt metal chips (approximately one inch by one inch in size) and was fitted with a glass receiver at the lower end. One liter of water was added to the receiver, and was circulated by a pump to the top of the column at the rate of 1.5 liters per minute. The liquid was maintained at 40°–45° C. by an in-line heat exchanger. Bromine was added to the column cocurrently with the circulating stream.

Over a period of three hours, 480 grams of bromine was fed into the circulating stream. At the end of the addition only 0.037 grams bromine per liter of solution was detected, indicating rapid and complete conversion to $CoBr_2$. An additional 500 ml of water was then introduced into the system, followed by 288 grams of bromine over a 90 minute period. At the end of this addition the total solution (1.76 liter) had a specific gravity of 1.48 and was determined to contain 283 grams of cobalt.

To this solution was added 32 grams of particulate electrolytic manganese metal, followed by 30 ml of bromine over a 20 minute period. The alternate addition of manganese and bromine was continued until a total of 264 grams of manganese metal and 250 ml of bromine had been added. The solution was then filtered and the residue was water washed. The combined filtrate and washings (2 liters) had a specific gravity of 1.802 and was found to contain 250 grams of manganese and 280 grams of cobalt, indicating a 94.7% efficiency in dissolution of the manganese metal.

The filter cake was then leached with hot water, refiltered, and the filtrate and residue were analyzed with the following results:

Filtrate — 3.5 grams Mn, 3.2 grams Co
Residue — 9.3 grams Mn

EXAMPLE 3

In order to demonstrate the flexibility of the process in preparing solutions having a range of Mn:Co ratios, a solution containing 40 grams of cobalt as $CoBr_2$ was prepared, then 10.7 grams of manganese metal and 10 ml bromine were added alternately. After a total of 186 grams manganese and 130 ml bromine had been added, the solution was filtered and the filtrate was analyzed. The filtrate had a Mn:Co ratio (weight) of 4:1. The remaining manganese was present as $MnO_2$ in the filter residue.

EXAMPLE 4

The procedure of Example 3 was followed to add a total of 110 grams of manganese to a solution containing 20 grams of cobalt as the bromide. Upon completion of this reaction, an additional 15 grams of manganese metal was added to the solution, bringing the pH to 5.05 and precipitating elemental cobalt. The solution was filtered and both filtrate and residue were analyzed.

|  | Mn | Co |
|---|---|---|
| Filtrate | 107 grams | 3.2 grams |
| Residue | 15 grams | 15 grams |

A solution having an Mn:Co ratio of 33:1 was thus prepared.

EXAMPLE 5

To 250 ml of the filtrate from Example 4 (containing 4.5 grams of cobalt per liter) was added 5 ml of an aqueous slurry containing 32 grams $Mn(OH)_2$ per liter. The solution was adjusted to a pH of 3.0 by this addition. An additional 45 ml of $Mn(OH)_2$ slurry was then added with agitation, the solution was allowed to stand for 15 minutes, and was filtered. The filtrate contained 0.79 grams of cobalt per liter, indicating removal of 83% of the soluble cobalt by conversion to insoluble cobalt hydroxide.

What is claimed is:

1. A method for the preparation of mixed manganous bromide and cobaltous bromide solution, which comprises
    (a) introducing manganese into an aqueous solution of cobaltous bromide in an amount less than the stoichiometric equivalent of cobalt present in said solution, while maintaining the solution at less than about 50° C.,
    (b) adding bromine to the solution in an amount at least stoichiometrically equivalent to the manganese added in step (a),
    (c) separating insoluble manganese and cobalt from the solution and recovering a solution of mixed Mn/Co bromide.

2. The method of claim 1 wherein the cobaltous bromide solution of step (a) is prepared by contacting cobalt with at least a stoichiometric equivalent of bromine in an aqueous solution at less than about 50° C.

3. The method of claim 2 wherein the pH of the aqueous solution is adjusted to less than about 2 by the addition of HBr.

4. The method of claim 1 wherein the manganese and bromide additions of steps (a) and (b) are repeated alternately.

5. The method of claim 1 wherein the insoluble manganese and cobalt separated in step (c) are returned to the solution of step (a).

6. The method of claim 1 wherein the solution temperature is maintained in the range of 35°–45° C.

7. The method of claim 1 wherein step (c) includes the additional step of precipitating dissolved cobalt prior to the separation.

8. A method for the preparation of mixed manganous bromide and cobaltous bromide solution, which comprises
 (a) introducing cobalt metal into an aqueous solution maintained at 35°–45° C.,
 (b) adding sufficient HBr to establish a pH of less than about 2,
 (c) introducing liquid bromine into the solution in an amount at least stoichiometrically equivalent to the cobalt added in step (a),
 (d) introducing particulate manganese metal into the solution in an amount up to the stoichiometric equivalent of the cobalt added in step (a),
 (e) introducing additional bromine into the solution in an amount at least stoichiometrically equivalent to the manganese added in step (d),
 (f) repeating steps (d) and (e) sequentially until the Mn:Co ratio in the solution is established in the desired range,
 (g) filtering the solution to remove insoluble manganese and cobalt.

9. The method of claim 8 wherein the insoluble cobalt and manganese removed in step (g) are returned to steps (a) and (d) respectively.

10. The method of claim 8 wherein step (g) includes the additional step of precipitating dissolved cobalt prior to the filtering.

11. The method of claim 8 wherein the Mn:Co ratio in step (e) is established in the range of <1:100 to 100:<1.

* * * * *

UNITED STATES PATENT AND TRADEMARK OFFICE
CERTIFICATE OF CORRECTION

PATENT NO. : 4,138,354
DATED : February 6, 1979
INVENTOR(S) : Irving SOCHOL and Jay Y. WELSH It is certified that error appears in the above–identified patent and that said Letters Patent are hereby corrected as shown below:

Column 2, lines 3 and 4 should read:

$$Mn + 2 H_2O \rightarrow Mn(OH)_2 + H_2 \quad (3)$$

$$2 Mn(OH)_2 + Br_2 + 2 H_2O \rightarrow 2 Mn(OH)_3 + 2 HBr \quad (4)$$

Signed and Sealed this

Thirty-first Day of July 1979

[SEAL]

Attest:

LUTRELLE F. PARKER
Attesting Officer  Acting Commissioner of Patents and Trademarks